United States Patent
Brooks

(10) Patent No.: US 8,464,838 B2
(45) Date of Patent: Jun. 18, 2013

(54) SYSTEM AND METHOD FOR GENERATING MECHANICAL MOVEMENT

(76) Inventor: Kenneth C. Brooks, Los Gatos, CA (US)

( * ) Notice: Subject to any disclaimer, the term of this patent is extended or adjusted under 35 U.S.C. 154(b) by 690 days.

(21) Appl. No.: 12/694,258

(22) Filed: Jan. 26, 2010

(65) Prior Publication Data

US 2010/0193297 A1   Aug. 5, 2010

Related U.S. Application Data

(60) Provisional application No. 61/147,470, filed on Jan. 26, 2009.

(51) Int. Cl.
*F03G 1/00* (2006.01)

(52) U.S. Cl.
USPC .......................................................... 185/39

(58) Field of Classification Search
USPC ................... 185/9, 10, 11, 12, 37, 38, 39, 40, 185/41 A, 41 C, 41 R, 41 WW
See application file for complete search history.

(56) References Cited

U.S. PATENT DOCUMENTS

| | | | | |
|---|---|---|---|---|
| 2,416,978 | A * | 3/1947 | Burgess | ........................ 310/300 |
| 6,982,497 | B2 | 1/2006 | Rome | |
| 7,245,062 | B2 | 7/2007 | Schmidt | |
| 7,329,959 | B2 | 2/2008 | Kim et al. | |
| 7,411,337 | B2 | 8/2008 | Tadayon et al. | |
| 7,429,801 | B2 | 9/2008 | Adamson et al. | |
| 7,442,336 | B2 | 10/2008 | Choi et al. | |
| 2008/0223032 | A1 | 9/2008 | Sumrall | |
| 2009/0195120 | A1 * | 8/2009 | Knospe | ........................ 310/300 |
| 2010/0187834 | A1 | 7/2010 | Brooks | |

OTHER PUBLICATIONS

[online];[published on Oct. 10, 2008]; [retrieved on Apr. 29, 2010, from: http://news.softpedia.com/news/Superhero-Trait-of-Gecko-Feet-Inspires-Adhesive-Material-95437.shtml.
[online];[published on Jan. 26, 2007]; [retrieved on Apr. 29, 2010, from: \\lokcbmobile\lokcb2\BMC\Metallic glass promises to become a useful material for nanotechnology fabrication.mht.
[online];[published in 2008]; [retrieved on Apr. 29, 2010, from: \\lokcbmobile\lokcb2\BMC\Poetry Self Sufficient Spring Capillary System for Generating Hydroelectricity.mht.
Ohkubo, Hirotuki, Highly-Precise Micro/Nano-processing Technologies of Synthetic Quartz Glass and its Applications, Hitachi Cable Rev. No. 25, Aug. 2006, pp. 5-10, Japan.
Brooks, Kenneth C., Amendment in Response to Non-Final Rejection. U.S. Appl. No. 12/360,574, filed Jan. 27, 2009.
Non-Final Rejection. U.S. Appl. No. 12/360,574, filed Jan. 27, 2009.
Final Rejection. U.S. Appl. No. 12/360,574, filed Jan. 27, 2009.

* cited by examiner

*Primary Examiner* — Phillip A Johnson
(74) *Attorney, Agent, or Firm* — Kenneth C Brooks

(57) ABSTRACT

In accordance with embodiments, there are provided systems and method for In accordance with embodiments, there are provided systems and method for generating mechanical movement that includes a resilient member having an original shape. A bulwark is connected to the resilient member. A system is provided to selectively apply a torsional force to the resilient member using capillary forces to rotate the resilient member with respect to the bulwark. This places the resilient member in a deformed shape. The system also selectively terminates the capillary forces allowing the resilient member to return to the original shape. These and other embodiments are described more fully below.

12 Claims, 7 Drawing Sheets

SYSTEM AND METHOD FOR GENERATING MECHANICAL MOVEMENT

CROSS-REFERENCE TO RELATED PATENT APPLICATIONS

The present patent application claims priority to U.S. provisional patent application No. 61/147,470 entitled SYSTEM AND METHOD FOR MOVING A RESILIENT MEMBER, filed Jan. 26, 2009 and having Kenneth C. Brooks identified as an inventor, which is incorporated by reference herein in its entirety.

FIELD OF THE INVENTION

The current invention relates mechanical movement. More particularly the current invention relates to a system for moving a resilient member.

BACKGROUND

The human race has long sought different means by which to produce mechanical movement without employing manual labor. Domestication of animals was one of the earliest labor savings techniques to produce mechanical movement. This was followed by harnessing the wind to grind meal and move ships. This was followed by the use of steam, coal, crude oil and electricity by which to power an engine and move vehicles.

There is a need, therefore, to produce new techniques to generate mechanical movement.

BRIEF SUMMARY

In accordance with embodiments, there are provided systems and method for generating mechanical movement that includes a resilient member having an original shape. A bulwark is connected to the resilient member. A system is provided to selectively apply a torsional force to the resilient member using capillary forces to rotate the resilient member with respect to the bulwark. This places the resilient member in a deformed shape. The system also selectively terminates the capillary forces allowing the resilient member to return to the original shape. These and other embodiments are described more fully below.

DETAILED DESCRIPTION

Figure 1:
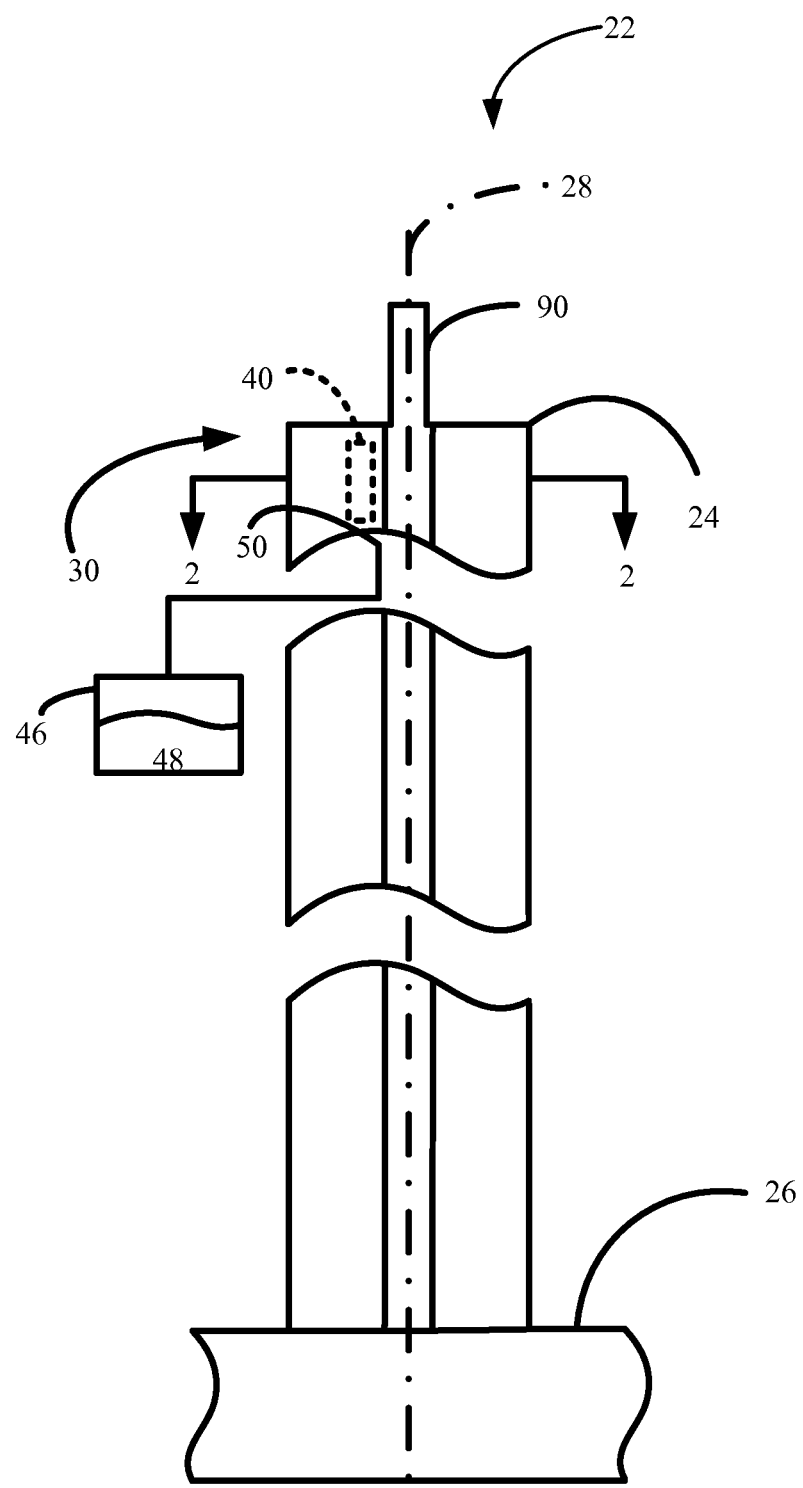
FIG. 1 is a simplified plan view of a system to generate mechanical movement in accordance with the present embodiment.

Referring to FIG. 1, an example of a potential-kinetic energy (PKE) system 22 for producing mechanical movement in accordance with one embodiment selectively stores potential energy and generates kinetic energy. System 22 operates in accordance with Hooke's law in which potential energy is produced as a result of applying a force to deform a resilient member 24 included therewith. Resilient member 24 may be fixedly attached to a bulwark 26 or integrally formed therewith. Resilient member 24 extends from bulwark 26 along an axis 28 terminating in an end 30. In the present embodiment resilient member 24 is a torsional spring to which torsional forces are selectively applied to twist resilient member 24 causing regions thereof to rotate about axis 28, placing resilient member 24 in a deformed shape. In the absence of torsional forces, resilient member 24 has an original shape. Upon termination of torsional forces resilient member 24 returns to the original shape. As a result, it is desired to form resilient member 24 from material that maintains adequate structural memory to return to the original shape after be placed in the deformed shape. Examples of materials from which resilient member 24 may be fabricated include stainless steel, aluminum, titanium, polymers, metallic alloys and the like.

Figure 2:
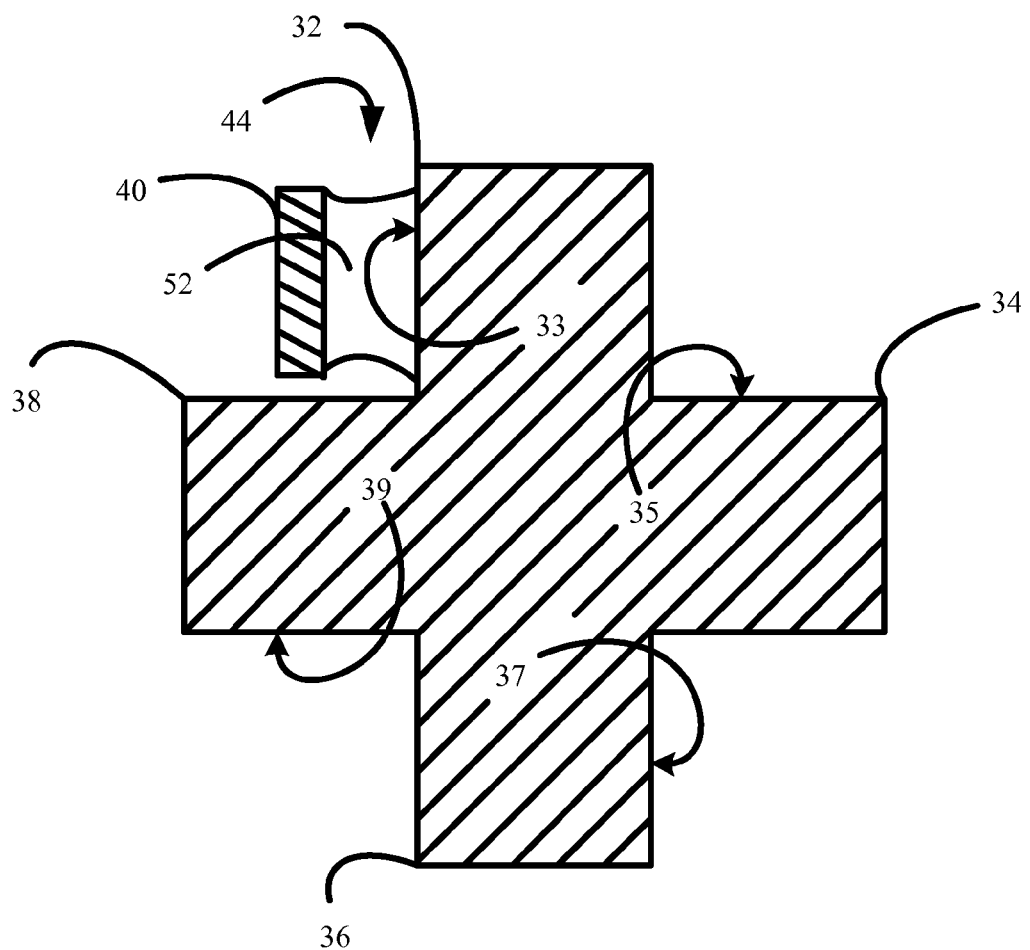
FIG. 2 is a cross-sectional view of a resilient member, shown in FIG. 1, taken along lines 2-2.

Referring to both FIGS. 1 and 2, in the present example resilient member 24 has a cruciform cross-section defining a plurality of shoulders, shown as 32, 34, 36 and 38. Each of shoulders 32, 34, 36 and 38 includes a surface 33, 35, 37 and 39, respectively. One or more of surfaces 33, 35, 37 and 39 is spaced-apart from one or more bodies, shown as body 40 spaced-apart from surface 33. Specifically, body 40 includes a surface 42 that is spaced-apart from surface 33, defining a volume 44 therebetween.

A supply 46 of fluid 48 includes an egress 50 positioned to deposit a portion 52 of fluid 48 into volume 44, using any known techniques to create a flow through egress, e.g., positive pressure applied to volume supply 46. The viscosity of portion 52 and dimensions of volume 44 are established so that upon application of portion 52, to one or both surfaces 33 and 42, capillary action occurs pulling surface 33 and 42 closer together, reducing the distance therebetween. Body 40 may be coupled with respect to bulwark 26 so that a distance between axis 28 and surface 42 may be controlled. With this configuration, the capillary action results in the movement of surface 33 toward surface 42. This is believed to occur as a result of intermolecular forces between the molecules of portion 52 and surfaces 33 and 42 that subjects resilient member 24 to a torsional force τ, which is in a direction away from body 40.

Torsional force $\tau_1$ causes twisting of resilient member 24 about axis 28, deforming resilient member 24. Deformation of resilient member 24 produces a restoring force $F_R$ in accordance with Hooke's law and which is in a direction away from surface 42. After completion of rotational movement, resilient member 24 is in a deformed state. In the deformed state, restoring force $F_R$ and torsional force τ are substantially at equilibrium, i.e. no further movement of resilient member 24 occurs. In this manner, resilient member 24 stores potential energy.

The potential energy stored in resilient member 24 may be released by disturbing the aforementioned equilibrium. This may be achieved in any convenient manner. For example, a mechanical force may be applied to body 40 causing a distance between body 40 and axis 28 to increase, i.e., applying a pulling force $F_P$ that moves in a direction away from body 40. Pulling force $F_P$ is of sufficient strength to overcome the intermolecular forces that exist between portion 52 and surface 33 and 42, referred to as release of intermolecular force, i.e., release. Specifically, the combination of restoring force $F_R$ and pulling force $F_P$ acting in opposite directions disrupts the aforementioned equilibrium and degrades the capillary action of portion 52. In response, resilient member 24 returns to the original shape by undergoing rotation about longitudinal axis 28. Resilient member 24 produces kinetic energy as it transforms between the deformed shape to the original shape. Upon reaching the original shape, resilient member 24 ceases rotating and once again defines volume 44, at which point both the potential energy and kinetic energy of resilient member 24 returns to zero. With restoring force $F_R$ and pulling force $F_P$ operating synergistically to terminate torsional force τ; it is not necessary that pulling force $F_P$ have a magnitude that is commensurate with either restoring force $F_R$ or torsional force τ. Pulling force $F_P$ need only be sufficient to disrupt the equilibrium that exists when restoring force $F_R$ is produced in response to resilient member 24 being subjected to torsional force τ. In one example, pulling force $F_P$ is applied manually with the use of one or more levers (not shown) that may be attached to either resilient member 24 and/or body 40.

Figures 3, 4:
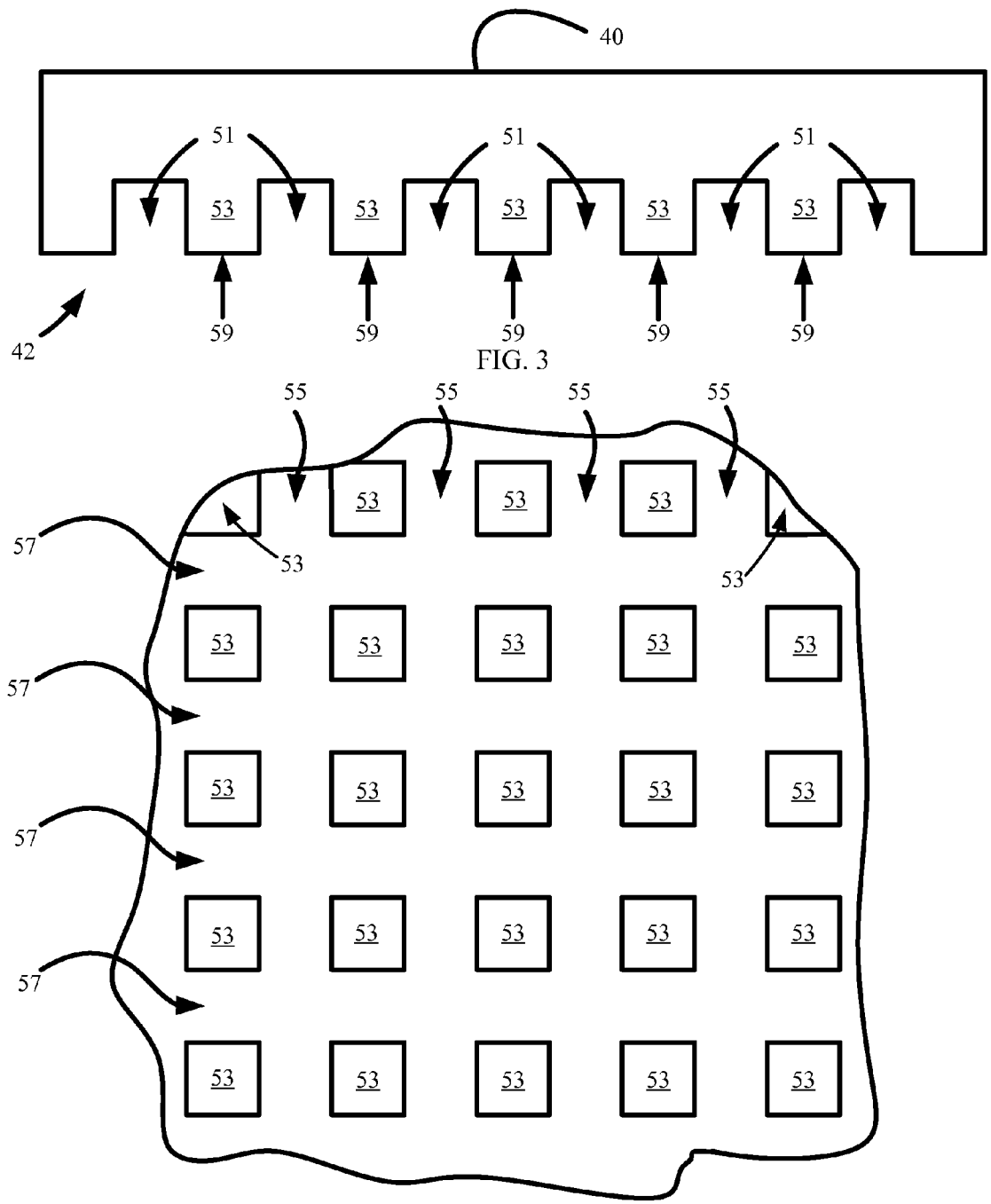
FIG. 3 is a cross-sectional view of a body shown in FIG. 2.
FIG. 4 is a partial bottom up view of the body shown in FIG. 3.

Referring to FIGS. 2, 3 and 4, to facilitate capillary action, body 40 may include a surface 42 that is featured. In this configuration surface includes a plurality of recessions 51 defining a plurality of spaced-apart protrusions 53. As shown recessions associated with a first subset 55 of recessions 51 extend parallel to each other along a first direction. Recessions associated with a second subset 57 of recession 51 extending parallel to one another along a second direction that is orthogonal to the first direction. In this manner, protrusions 53 have a rectangular cross-section and are spaced-apart from an adjacent protrusion 53 a distance 61. It is desired in this configuration that surface 33 have a substantially smooth, in not planar profile. Additionally, it is desired that an apex surface 59 of each of protrusions 53 lie in a common plane that extends parallel to a plane in which surface 33 lies, defining a depth 63 for each recession 51. It should be noted that capillary action may be achieved satisfactorily upon reversal of the patterned in smooth surfaces such that surface 33 is patterned as discussed above with respect to surface 42 and surface 42 having the profile of surface 33. In an alternative embodiment, both surfaces 33 and 42 may be substantially smooth, if not planar. In this configuration, however, it is desired that surface 33 extend parallel to surface 42. The present configuration is discussed with respect to surface 42 being patterned and surface 33 being smooth.

The magnitude of the capillary action provided by portion 52 is directly related to the 52 number of surface interactions between the molecules included in portion 50 and surfaces 42 and 33. To that end, it is desired that spacing 61 and depth 63 be established with respect to the size of molecules in portion 52 to provide rapid capillary action when surface 42 is disposed proximate to surface 33, with the exact dimensions being dependent upon the desired rate of capillary action. One example, provide spacing 61 and depth 63 with dimensions on the order of tens of nanometers to several 100 nanometers with the molecules in portion having dimensions smaller that either spaced 61 and/or depth 63. Additionally, portion have very low viscosity to provide rapid filling of volume 44, which includes recessions 51. An example of a low viscosity fluid is formed from isobornyl acrylate (IBOA) and n-hexyl acrylate (n-HA). An example of a composition of portion 52 comprises approximately 70 to 75% IBOA and 25-30% n-HA by weight which is believed to provide a viscosity in a range 2 to 10 Centipoises.

Figure 5:
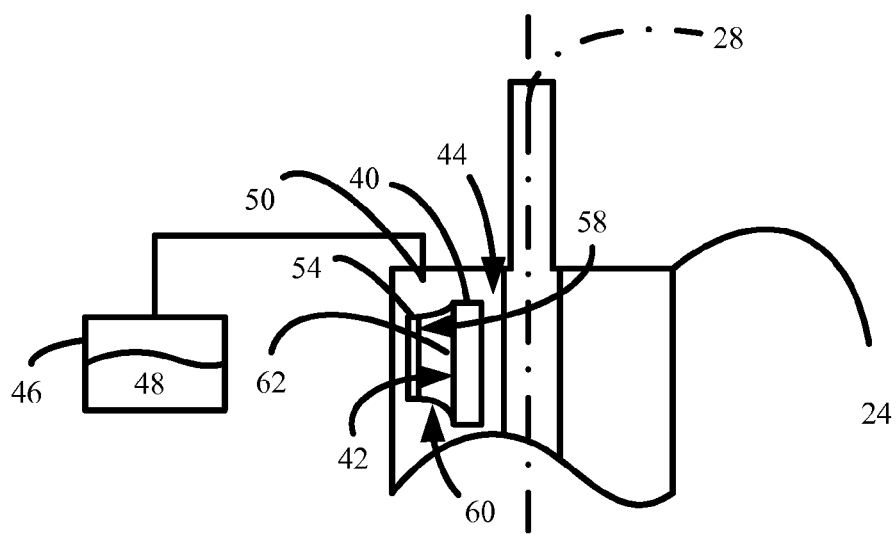
FIG. 5 is a detailed side view of one end of a resilient member shown in FIG. 2.

In an alternate configuration shown in FIG. 5, pulling force $F_P$ is applied through implementation of a secondary body 54. Secondary body 54 has a surface 58 that is in juxtaposition with surface 42 and is spaced-apart therefrom, defining a volume 60 therebetween upon restoring force $F_R$ and torsional force τ reaching equilibrium. Volume 60 has dimensions sufficient so that an additional portion 62 of fluid 48 may be disposed therein creating capillary action so that surface 58 moves toward surface 42 a sufficient distance to provide pulling force $F_P$ with a desired magnitude. It is believed that the kinetic energy produced by resilient member 24 may be attenuated during release and that the magnitude of attenuation may be inversely proportional to the rate at which the capillary action between portion 52 and surface 33 and 42 is degraded and/or abrogated. This is believed to be proportional to the magnitude of pulling force $F_P$ and the rate at which pulling force $F_P$ is applied to body 40. In the present configuration pulling force $F_P$ is applied as instantaneous as possible with the result being that the magnitude of attenuation of the kinetic energy produced by rotation of resilient member 24 from the deformed shape to the original shape being inversely proportional to the magnitude of pulling force $F_P$.

Figure 6:
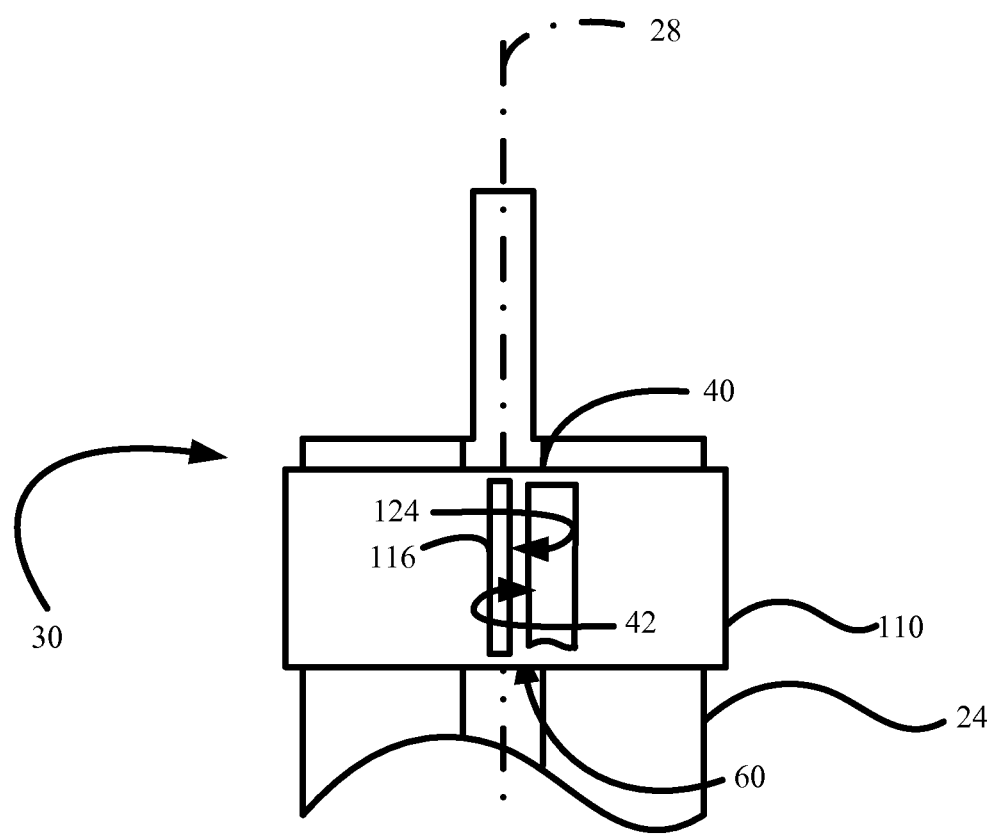
FIG. 6 is a detailed side view of the system, shown in FIG. 1, in accordance with a second embodiment.
Figure 7:
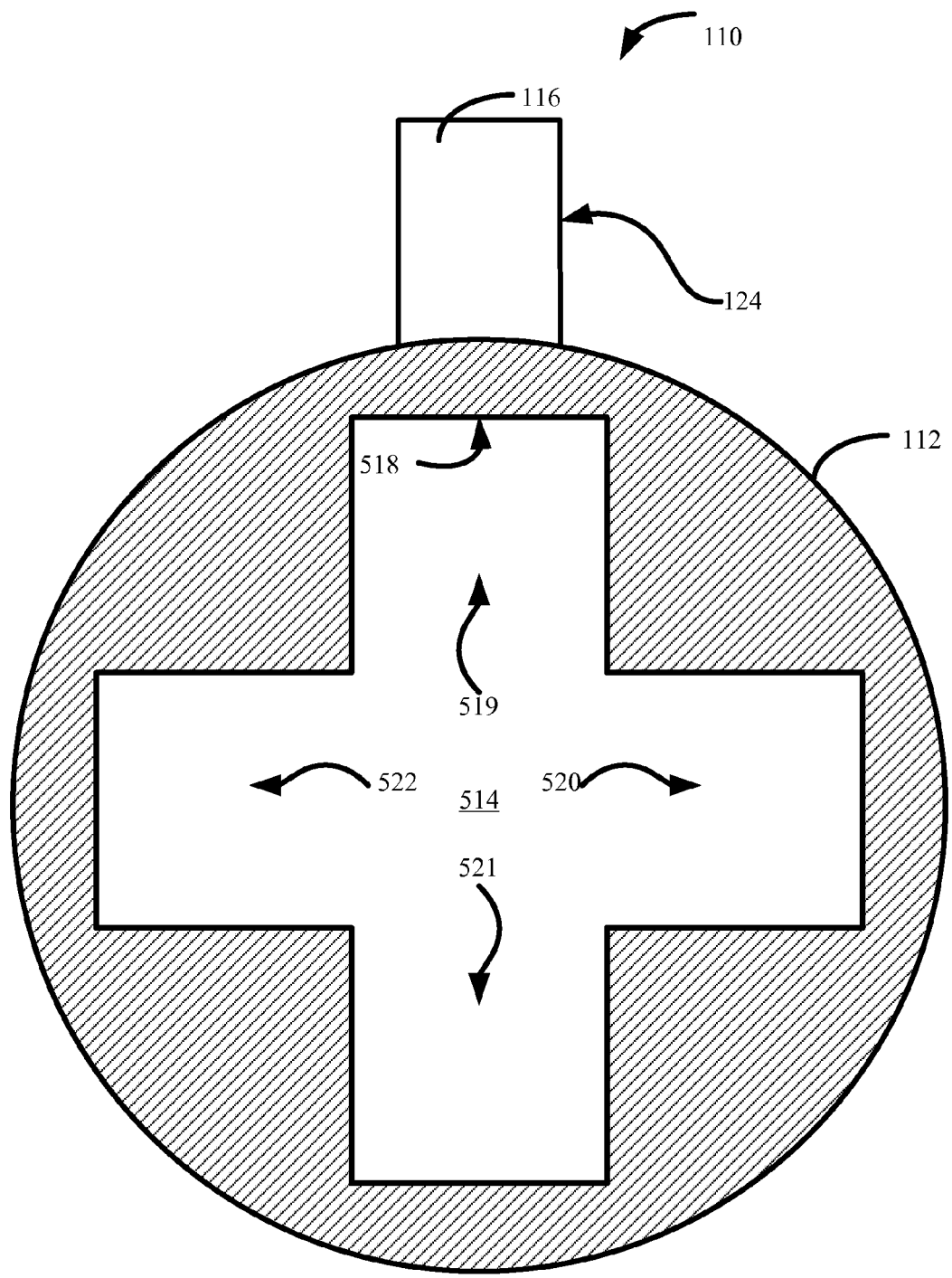
FIG. 7 is a top down view of a journal member shown in FIG. 8.

Referring to both FIGS. 6 and 7, in a second embodiment, capillary action with body 40 occurs by implementing a journal member 110 that includes a trunk 112 having a throughway 114 and a detent 116 extending from trunk 112. Throughway 514 defines a surface 518 having a profile complementary to a profile of a region of resilient member 24 around which trunk 112 is positioned. In the present example, trunk 112 is disposed to be in superimposition with a region of resilient member 24 having the cruciform cross-section. Surface 518 defines four serif recesses 519, 520, 521 and 522, each of which is to receive a portion of one of projections 32, 34, 36 and 38. The relative dimensions of throughway 514 and resilient member 24 are established so that rotation of journal member 110 about axis 28 produces torsional force $τ_1$ on resilient member 24. To that end, detent 116 includes a surface 124 that faces surface 42 so that capillary action may be generated therebetween, as discussed above.

Figure 8:
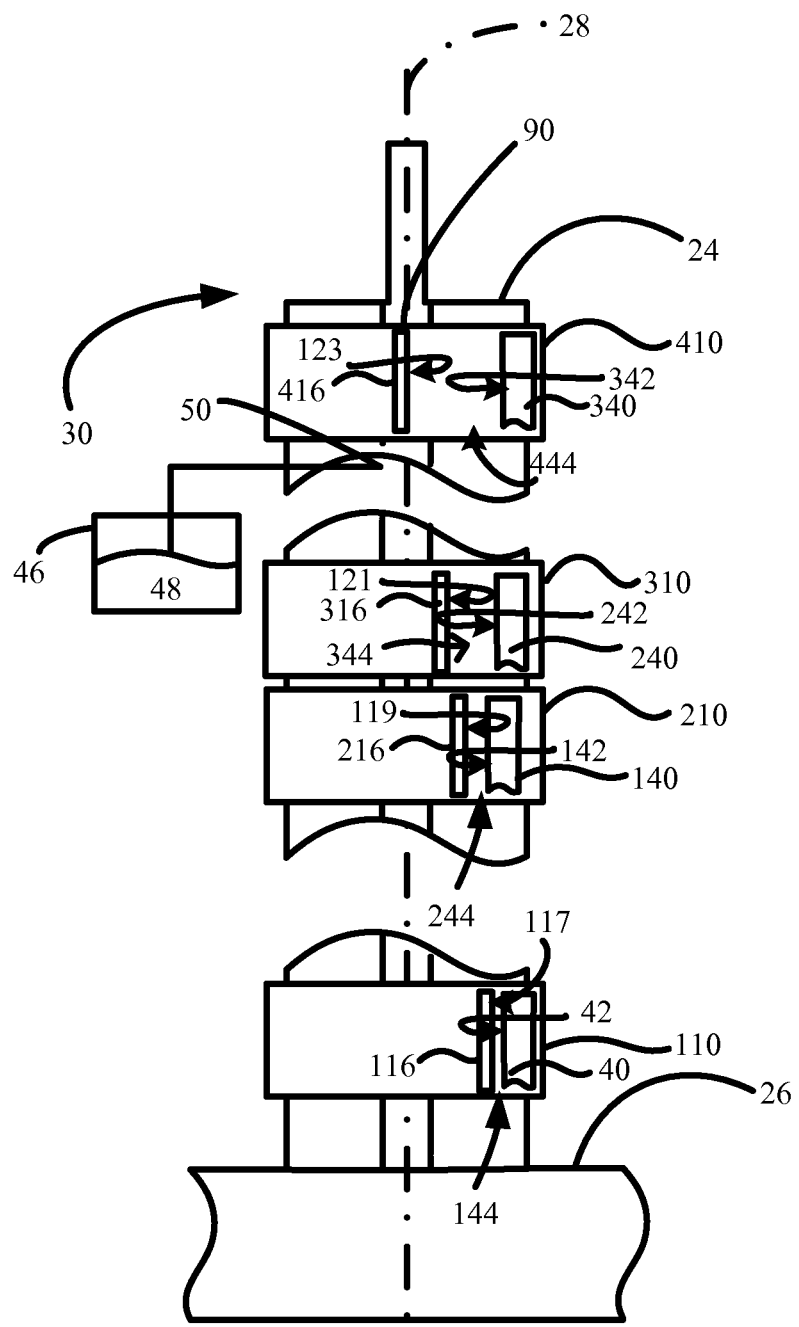
FIG. 8 is a detailed side view of the system, shown in FIG. 8, in accordance with an alternate embodiment.

Referring to FIG. 8, in another embodiment the potential energy stored in resilient member 24 by augmented by disposing a plurality of journal members, shown as 110, 210, 310 and 410 along different portions of resilient member 24. Each journal members 210, 310 and 410 includes the features described above with respect to journal member 110. As such a plurality of detents 116, 216, 316 and 416 are situated at about axis 28 at different distance from bulwark 26, as are a plurality of corresponding bodies 40, 140, 240 and 340. Each of bodies 40, 140, 240 and 340 includes a surface located at a different angular position with respect to axis 28. Body 40 includes surface 42, bodies 140, includes surface 142, body 240 includes surface 242 and body 340 includes surface 342.

Figure 9:
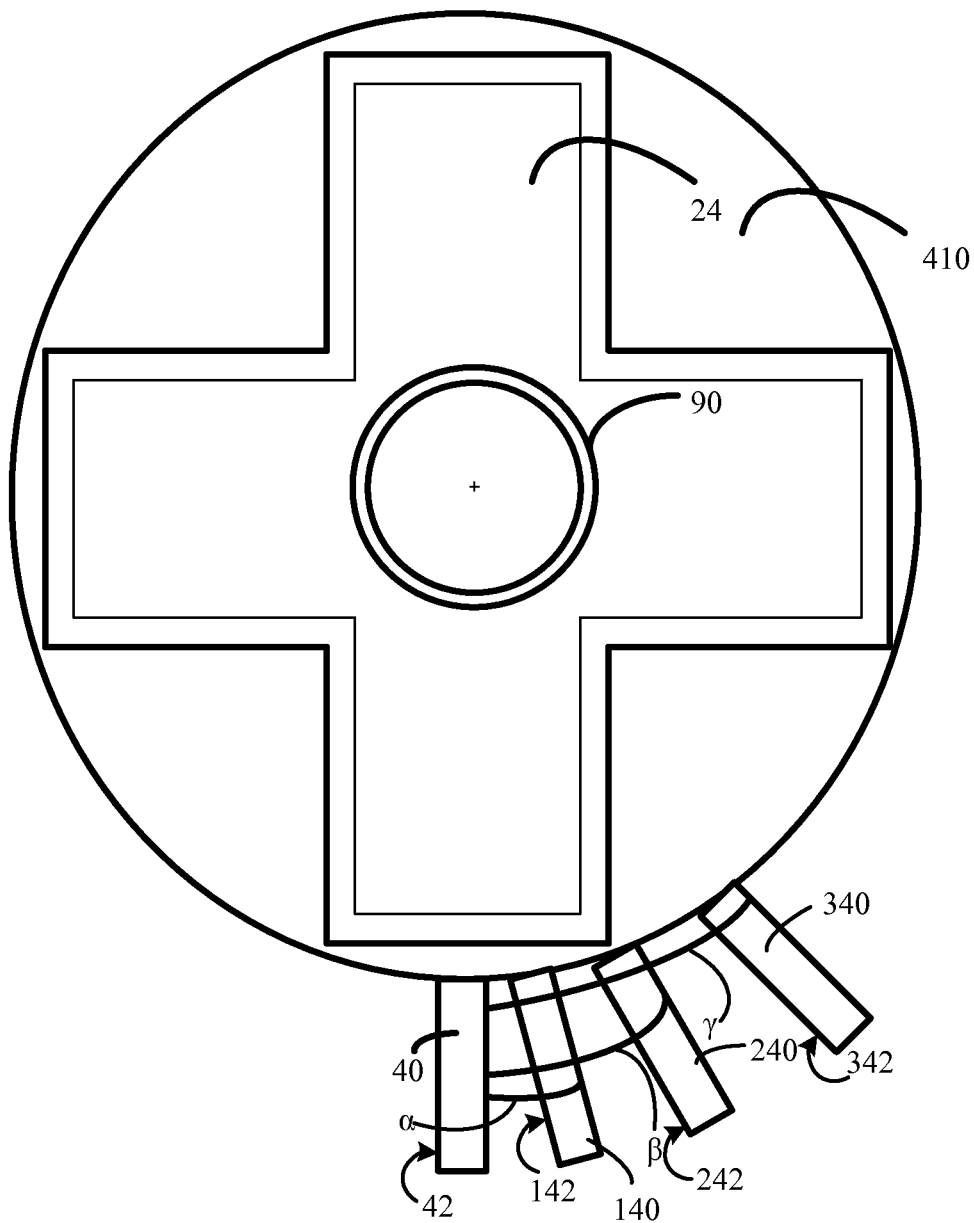
FIG. 9 is a simplified top down view of the system shown in FIG. 8.

Referring to both FIGS. 8 and 9, using body 40 as a starting point, the angular position of surfaces 142, 242 and 342 form angles α, β, and γ, respectively, with respect to surface 42. In this manner, surfaces are arranged about axis 28 at different angular positions. Angle β is greater than angle α and less than angle γ, with γ being the largest angle. The relative angular position of surfaces 42, 142, 242 and 342 are established to produce torsional forces $τ_1, τ_2, τ_3$ and $τ_4$ on resilient member 24. To that end, surface 42 is in juxtaposition with and spaced-apart from surface 117 of detent 116, defining volume 144 therebetween. Egress 50 of supply 46 is positioned to deposit a portion of fluid 48 into volume 144 so that upon application thereof on one or both surfaces 117 and 42 capillary action occurs pulling surfaces 117 and 42 closer together, as discussed above. This produces first torsional force $\tau_1$ that causes rotation of resilient member 24. As discussed above, restoring force $F_{R1}$ and torsional force $\tau_1$ reach equilibrium, i.e. no further movement of resilient member 24 as a result of first torsional force $\tau_1$.

Angle $\alpha$ is established so that upon restoring force $F_{R1}$ and torsional force $\tau_1$ reaching equilibrium a second volume 244 is generated between a surface 119 of detent 118 and surface 142, which is in juxtaposition with and spaced-apart therefrom. The dimensions of volume 244 are established so that capillary action may occur between a second portion 152 of fluid 48 deposited therein and surfaces 119 and 142. This produces a second torsional force $\tau_2$. It is desired that second torsional force $\tau_2$ be greater than first restoring force $F_{R1}$ in order to increase deformation of resilient member 24 and, therefore, increase the potential energy stored therein. To that end volume 244 is established to be greater than volume 144. For a given fluid 48 this may be achieved by providing greater areas of surfaces 119 and 142 that are in juxtaposition, when compared to the areas of surfaces 42 and 117. Alternatively, volumes 144 and 244 may have common dimensions and the portions of fluid 48 therein may be different fluids so that one which produces greater intermolecular forces with surfaces 142 and 199. To that end, egress 50 and/or supply 46 may be configured to move with respect to resilient member 34 and deposit fluid 48 in different volumes 144, 244, 344 and 444. As shown, supply 46 includes a second egress 152 positioned to deposit a portion of fluid 48, as described. In response to being subjected to torsional force $\tau_2$, resilient member 42 undergoes further deformation increasing the restoring force, referred to as a second restoring force $F_{R2}$. Deformation, and therefore movement, of resilient member 42 ceases upon torsional force $\tau_2$ and second restoring force $F_{R2}$ reaching equilibrium.

Angle $\beta$ is established so that upon second restoring force $F_{R2}$ and second torsional force $\tau_2$ reaching equilibrium a second volume 344 is generated between a surface 121 of detent 120 and surface 242, which is in juxtaposition with and spaced-apart therefrom. The dimensions of volume 344 are established so that capillary action may occur between a second portion 252 of fluid 48 deposited therein and surfaces 121 and 242 to produce a third torsional force $\tau_3$. It is desired that third torsional force $\tau_3$ be greater than second restoring force $F_{R2}$ in order to increase deformation of resilient member 24 and, therefore, increase the potential energy stored therein. To that end volume 344 is established to be greater than volume 244, which may be achieved as discussed above with respect to volumes 144 and 244. In response to being subjected to third torsional force $\tau_3$, resilient member 42 undergoes further deformation increasing the restoring force, referred to as a third restoring force $F_{R3}$. Deformation, and therefore movement, of resilient member 42 ceases upon third torsional force $\tau_3$ and third restoring force $F_{R3}$ reaching equilibrium.

Angle $\gamma$ is established so that upon third restoring force $F_{R3}$ and third torsional force $\tau_3$ reaching equilibrium a fourth volume 444 is generated between a surface 123 of detent 122 and surface 342, which is in juxtaposition with and spaced-apart therefrom. The dimensions of fourth volume 444 are established so that capillary action may occur between a third portion 352 of fluid 48 deposited therein and surfaces 123 and 342 to produce a fourth torsional force $\tau_4$. It is desired that fourth torsional force $\tau_4$ be greater than third restoring force $F_{R3}$ in order to increase deformation of resilient member 24 and, therefore, increase the potential energy stored therein. To that end, fourth volume 444 is established to be greater than third volume 344, which may be achieved as discussed above with respect to volumes 144 and 244. In the present example, supply 46 includes a fourth egress 352 positioned to deposit a portion of fluid 48 into fourth volume 444 to produce the capillary action described above with respect to volumes 144. In response to being subjected to fourth torsional force $\tau_4$, resilient member 42 undergoes further deformation increasing the restoring force, referred to as a fourth restoring force $F_{R4}$. Deformation, and therefore movement, of resilient member 42 ceases upon fourth torsional force $\tau_4$ and fourth restoring force $F_{R4}$ reaching equilibrium.

The potential energy stored in resilient member 24 may be released by disturbing the aforementioned equilibrium, as discussed above. For example, a mechanical force may be applied to any one of detents 40, 140, 240 and 340 to create pulling force $F_P$ that moves in a direction away from resilient member 24. It is desired that pulling force $F_P$ have sufficient magnitude to overcome the intermolecular forces present in any one of volumes 144, 244, 344 and 444. The combination of fourth restoring force $F_{R4}$ and pulling force $F_P$ act in opposite directions to disrupt the aforementioned equilibrium and degrade the capillary action of one or the portions of fluids 48 deposited in volumes 144, 244, 344 and 444 when one or more detents 140, 240, 340 or 440 is subjected to pulling force $F_P$. In one example, pulling force $F_P$ may act upon detent 440 that would result in the degradation of the intermolecular forces between portion 452 and surface 123 and 442. Considering that fourth restoring force $F_{R4}$ is greater than any one of first torsional force $\tau_1$, second torsional force $\tau_2$ and third torsional force $\tau_3$, the kinetic energy produced by fourth restoring force $F_{R4}$ would overcome the intermolecular forces in each of volumes 144, 244 and 344 to allow resilient member to return to the original shape.

The presence of intermolecular forces in volumes 144, 244 and 344 during release of molecular forces in volume 444 may result in attenuation of kinetic energy produced by resilient member 24. To reduce, if not avoid, these deleterious effects, it may be advantageous to release the intermolecular forces in one or more, and possibly all, of volumes 144, 244 and 344, before releasing intermolecular forces in volume 444. It is entirely possible that release of the intermolecular forces in one or more, and possibly all, of volumes 144, 244 and 344 may result in release of intermolecular forces in volume 444 before application of pulling force $F_P$ to detent 122. This may also result in attenuation of kinetic energy produced by resilient member 24 returning to the original shape. To avoid this situation one embodiment may include providing volume 444 with dimensions sufficient so that the intermolecular forces generated by portion 452 are of sufficient magnitude to maintain equilibrium with fourth restoring force $F_{R4}$ in the absence of any one of first torsional force $\tau_1$, second torsional force $\tau_2$, and third torsional force $\tau_3$. In this configuration it is possible to release intermolecular forces in each of volumes 142, 142 and 342 while maintaining equilibrium with both restoring fourth force $F_{R4}$ and of any one of fourth torsional force $\tau_4$. Thereafter, intermolecular forces in fourth volume 444 may be released by applying pulling force $F_P$ to detent 416.

It should be understood that the description recited above is list examples of the invention and that modifications and changes to the examples may be undertaken which are within the scope of the claimed invention. Therefore, the scope of the appended claims should be accorded the broadest interpretation so as to encompass all such modifications and similar arrangements, including a full scope of equivalents.

The invention claimed is:

1. A system for generating mechanical movement comprising:

a resilient member having an original shape extending along a longitudinal axis;

a bulwark connected to said resilient member; and a PKE sub-system to selectively apply a torsional force to said resilient member using capillary forces to rotate said resilient member with respect to said bulwark, providing said resilient member with a deformed shape, and terminate said capillary forces, whereby said resilient member returns to said original shape.

2. The system as recited in claim 1 wherein said resilient member further includes a shoulder and said PKE sub-system further includes a first body having a first body surface spaced-apart from said shoulder a distance, defining a first volume therebetween and a supply of fluid having a first egress disposed to deposit a portion of fluid of said supply in said volume, with said distance being established to generate cap Wary action with said portion disposed therebetween and cause said distance to reduce imparting rotational movement between said resilient member and said bulwark about said longitudinal axis.

3. The system as recited in dam 2 wherein said system further includes a second body, spaced-apart from said first body and having a second body surface facing an additional surface and spaced-apart therefrom a second distance, defining a second volume therebetween, with said supply configured to deposit a second portion into said second volume, with said second volume being established to generate cap Wary action to terminate capillary action in said first volume.

4. The system as recited in claim 1 wherein said system further includes a journal member having a throughway, through which said resilient member passes, and a detent extending from said journal member.

5. The system as recited in claim 1 wherein said PKE sub-system further includes a journal member having a throughway, through which said resilient member passes, and a detent extending from said journal member and a first body having a first body surface spaced-apart from detent at a distance, defining a first volume therebetween and a supply of fluid having a first egress disposed to deposit a portion of fluid of said supply in said volume, with said distance being established to generate capillary action with said portion disposed therebetween and cause said distance to reduce imparting rotational movement between said resilient member and said bulwark about said longitudinal axis.

6. The system as recited in claim 1 wherein said PKE sub-system includes a plurality of journal members disposed along different portions of said resilient member and a plurality of first bodies, with each of said plurality of journal members having a throughway, through which said resilient member passes, and a detent extending from said journal member with each of said plurality of first bodies being in juxtaposition with the detent of one of the plurality of journal members to sequentially define a plurality of detent first body pairs, with said plurality of detent first body pairs arranged to sequentially define a plurality of volumes therebetween to facilitate generation of capillary action within said volume in the presence of a portion of liquid.

7. The system as recited in claim 6 wherein said PKE sub-system further includes a supply of fluid to deposit said fluid into said plurality of volumes.

8. The system as recited in claim 1 wherein said PKE sub-system includes a plurality of journal members disposed along different portions of said resilient member, a plurality of first bodies and a supply of liquid, with each of said plurality of journal members having a throughway through which said resilient member passes, and a detent extending from said journal member with each of said plurality of first bodies being in juxtaposition with the detent of one of the plurality of journal members defining a plurality of detent-first body pairs, with said plurality of detent first body pairs arranged to sequentially define a plurality of volumes therebetween to facilitate generation of capillary action within said volume in the presence of a portion of liquid, with said PKE sub-system configured to sequentially rotate said resilient member commencing with one of said plurality of journal member located closest said bulwark.

9. The system as recited in claim 1 wherein said PKE sub-system includes a plurality of journal members disposed along different portions of said resilient member, a plurality of first bodies and a supply of liquid, with each of said plurality of journal members having a throughway, through which said resilient member passes, and a detent extending from said journal member with each of said plurality of first bodies being in juxtaposition with the detent of one of the plurality of journal members defining a plurality of detent-first body pairs, with said plurality of detent first body pairs arranged to sequentially define a plurality of volumes therebetween to facilitate generation of capillary action within said volume in the presence of a portion of liquid, with said PKE sub-system configured to sequentially rotate said resilient member commencing with one of said plurality of journal member located furthest from said bulwark.

10. A method of generating echanical movement, said method comprising:

providing a resilient member having an original shape;

deforming said original shape by subjecting said resilient member to a torsional force through capillary action, placing said resilient member in a deformed shape; and imparting rotation to said resilient member by terminating said torsional force through degradation of said capillary action thereby allowing said resilient member to return to said original shape.

11. The method as recited in claimn 10 further including sequentially imparting additional torsional forces to said resilient member along different portions of a length thereof.

12. The method as recited in claim 10 further including sequentially applying additional torsional forces to said resilient member to impart angular movement of said resilient member about a longitudinal axis thereof.

* * * * *